US012715390B2

(12) United States Patent
Lee et al.

(10) Patent No.: US 12,715,390 B2
(45) Date of Patent: Aug. 25, 2026

(54) APPARATUS AND METHOD FOR CONTROLLING VEHICLE

(71) Applicants: Hyundai Motor Company, Seoul (KR); Kia Corporation, Seoul (KR)

(72) Inventors: Sang Min Lee, Suwon-Si (KR); Jang Yeol Kim, Yongin-Si (KR); Eul Yong Kim, Hwaseong-Si (KR); Dae Han Choi, Hwaseong-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 494 days.

(21) Appl. No.: 18/204,163

(22) Filed: May 31, 2023

(65) Prior Publication Data

US 2024/0132014 A1 Apr. 25, 2024
US 2024/0227725 A9 Jul. 11, 2024

(30) Foreign Application Priority Data

Oct. 21, 2022 (KR) ........................ 10-2022-0136622

(51) Int. Cl.
*B60R 22/48* (2006.01)
*H04W 4/90* (2018.01)

(52) U.S. Cl.
CPC ...... *B60R 22/48* (2013.01); *B60R 2022/4816* (2013.01); *H04W 4/90* (2018.02)

(58) Field of Classification Search
CPC .......... B60R 2022/4816; B60R 21/015; B60R 22/48; G08B 25/016; H04W 4/90
USPC .......................................................... 701/45
See application file for complete search history.

(56) References Cited

U.S. PATENT DOCUMENTS 10,232,813 B2 3/2019 Loeffler
10,507,790 B1 12/2019 Banks

FOREIGN PATENT DOCUMENTS

| | | | |
|---|---|---|---|
| KR | 20170033957 | * | 3/2017 |
| KR | 10-1863167 B | | 6/2018 |
| KR | 10-2277290 B | | 7/2021 |
| KR | 20210082024 | * | 7/2021 |

OTHER PUBLICATIONS

KR-2017003395 (translation).*

* cited by examiner

*Primary Examiner* — Phutthiwat Wongwian
(74) *Attorney, Agent, or Firm* — MORGAN, LEWIS & BOCKIUS LLP

(57) ABSTRACT

A vehicle control apparatus includes a sensor provided in each of vehicle seats and outputting a fastening signal when a seat belt is fastened, and outputting a non-fastening signal when the seat belt is not fastened, and a controller that stores an available seat count based on the non-fastening signal and to update the available seat count when a seat belt signal is changed and output to the non-fastening signal from a vehicle seat where the fastening signal is output.

14 Claims, 7 Drawing Sheets

APPARATUS AND METHOD FOR CONTROLLING VEHICLE

CROSS-REFERENCE TO RELATED APPLICATION

The present application claims priority to Korean Patent Application No. 10-2022-0136622, filed on Oct. 21, 2022, the entire contents of which is incorporated herein for all purposes by this reference.

BACKGROUND OF THE PRESENT DISCLOSURE

Field of the Present Disclosure

The present disclosure relates to an apparatus and method for controlling a vehicle.

Description of Related Art

An emergency-call (E-call) system refers to a system that delivers information such as the location and condition of an accident to a rescue center at the same time as the accident occurs after a terminal inside a vehicle recognizes the accident when the accident occurs in the vehicle. The E-call system protects the lives of passengers in the event of an accident, and thus laws and regulations are being enacted to mount the E-call system in vehicles in many countries.

Europe applies the safety rating of a vehicle through NCAP certification, and additional points may be obtained through the installation of the E-call system upon NCAP certification. Accordingly, the E-call system is also being provided in Europe. Nowadays, when not only the location and condition of the accident, but also the number of available seats (referred to as an "available seat count") (the number of passengers capable of boarding a vehicle) in a vehicle are transmitted in the event of an accident, additional points may be obtained upon NCAP certification. Accordingly, there is a demand for technology development for determining the available seat count (the number of passengers capable of boarding a vehicle) in a vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus and method for determining the number of available seats (the number of passengers capable of boarding a vehicle) in a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus includes a sensor provided in each of vehicle seats and outputting a fastening signal when a seat belt is fastened, and outputting a non-fastening signal when the seat belt is not fastened, and a controller that stores an available seat count based on the non-fastening signal and to update the available seat count when a seat belt signal is changed and output to the non-fastening signal from a vehicle seat where the fastening signal is output.

The controller may be configured to determine whether the fastening signal is output from at least one vehicle seat, when a vehicle power supply is applied to a vehicle for a first time.

The controller may monitor a seat belt signal of the vehicle seat where the fastening signal is output, and may store a result of the monitoring.

The controller may be configured to determine whether the seat belt signal is changed and output to the non-fastening signal from the vehicle seat where the fastening signal is output, when a vehicle power supply is turned off for a first time and then is applied to a vehicle again.

The controller may be configured to determine that a vehicle seat, where the seat belt signal is changed and output to the non-fastening signal, is an available seat.

The controller may be configured to count vehicle seats from each of which the seat belt signal is changed and output to the non-fastening signal, and may update the stored available seat count based on a result of the counting.

The controller may be configured to delete the seat belt signal of the vehicle seat, which is changed and output to the non-fastening signal, from a result of the monitoring.

The controller may be configured to transmit vehicle state information and the updated available seat count to a server when an Emergency-call (E-call) is executed.

According to an aspect of the present disclosure, a vehicle control method includes obtaining a signal of a seat belt from a sensor provided in each of vehicle seats and outputting a fastening signal when the seat belt is fastened, and outputting a non-fastening signal when the seat belt is not fastened, storing an available seat count based on the non-fastening signal when the non-fastening signal is output from the sensor, and updating the available seat count when the signal of the seat belt is changed and output to the non-fastening signal from a vehicle seat from which the fastening signal is output.

The method may further include determining whether the fastening signal is output from at least one vehicle seat, when a vehicle power supply is applied to a vehicle for a first time.

The method may further include monitoring a seat belt signal of the vehicle seat where the fastening signal is output, and storing a result of the monitoring.

The method may further include determining whether the signal of the seat belt is changed and output to the non-fastening signal from the vehicle seat where the fastening signal is output, when a vehicle power supply is turned off for a first time and then is applied to a vehicle again.

The method may further include determining that a vehicle seat, where the signal of the seat belt is changed and output to the non-fastening signal, is an available seat.

The method may further include counting vehicle seats from each of which the signal of the seat belt is changed and output to the non-fastening signal, and updating the stored available seat count based on a result of the counting.

The method may further include deleting the seat belt signal of the vehicle seat, which is changed and output to the non-fastening signal, from a result of the monitoring.

The method may further include transmitting vehicle state information and the updated available seat count to a server when an E-call is executed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
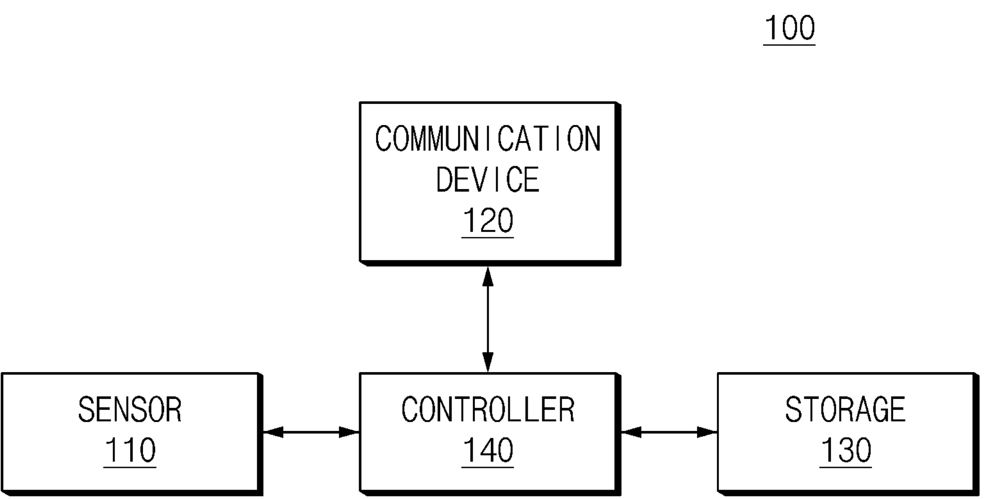
FIG. 1 is a diagram showing a configuration of a vehicle control apparatus, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to components of each drawing, it should be noted that the same components have the same reference numerals, although they are indicated on another drawing. In describing embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning which is consistent with their meaning in the context of the present disclosure and the relevant art and will not be interpreted in an idealized or overly formal sense unless expressly so defined herein.

FIG. 1 is a diagram showing a configuration of a vehicle control apparatus, according to an exemplary embodiment of the present disclosure.

As illustrated in FIG. 1, a vehicle control apparatus 100 according to an exemplary embodiment of the present disclosure may include a sensor 110, a communication device 120, storage 130, and a controller 140.

The sensor 110 may include a seat belt reminder (SBR) sensor provided on a plurality of seats in a vehicle. The SBR sensor may detect whether a seat is occupied, or whether a seat belt is fastened. Here, the fastening may mean fastening of a seat belt buckle. When the seat belt is fastened, the sensor 110 may output a fastening signal of the seat belt. When the seat belt is not fastened, the sensor 110 may output a non-fastening signal of the seat belt.

Furthermore, the sensor 110 may detect a state of a vehicle. According to an exemplary embodiment of the present disclosure, the sensor 110 may include a collision sensor, a wheel sensor, a speed sensor, a heading sensor, a yaw sensor, a gyro sensor, a position sensor, and a steering wheel sensor that are used to detect various states of the vehicle, and the detected information may be transmitted to the controller 140.

The communication device 120 may wirelessly communicate with a server. Here, the server may include a control center server or an emergency rescue center server that remotely collects vehicle information. The communicator 120 may communicate with the server in various wireless communication schemes such as Wi-Fi, Wibro, Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), and the like.

The storage 130 may store at least one algorithm for performing determination or execution of various commands for an operation of a vehicle control apparatus according to an exemplary embodiment of the present disclosure. The storage 130 may include at least one storage medium of a flash memory, a hard disk, a memory card, a read-only memory (ROM), a random access memory (RAM), an electrically erasable programmable read only memory (EEPROM), a programmable read-only memory (PROM), a magnetic memory, a magnetic disk, or an optical disc.

The controller 140 may be implemented by various processing devices such as a microprocessor provided with a semiconductor chip configured for performing or executing various commands, and may control an operation of a vehicle control apparatus according to an exemplary embodiment of the present disclosure. The controller 140 may be electrically connected to the sensor 110, the communication device 120, and the storage 130 through wired cables or various circuits to transmit electrical signals including control commands, and may transmit and receive the electrical signals including control commands through various wireless communication networks such as a Controller Area Network (CAN).

When a power supply is applied to a vehicle for the first time after the vehicle is assembled, the controller 140 may obtain a seat belt signal for each seat of the vehicle. Because the seat belt of the vehicle seat is not fastened by default when the vehicle is assembled, a non-fastening signal may be output from the sensor 110 of a vehicle seat. Accordingly, the controller 140 may be configured to determine an available seat count based on the non-fastening signal.

However, when the seat belt is fastened due to some errors, a fastening signal may be output from the sensor 110 of a vehicle seat on which the seat belt is fastened. Accordingly, the controller 140 may be configured to determine whether to determine the number of seat belt signals as the available seat count, by monitoring a seat belt signal of the vehicle seat from which the fastening signal is output.

When non-fastening signals are output, the controller 140 may count the number of vehicle seats, from which the non-fastening signals are output. Besides, the controller 140 may be configured to determine and store an available seat count based on the counting result of vehicle seats from which the non-fastening signals are output. Moreover, when a seat belt signal is changed and output to a non-fastening signal in the vehicle seat from which the fastening signal is output, the controller 140 may update the available seat count. The more detailed description is provided with reference to FIG. 2 and FIG. 3.

Figure 2:
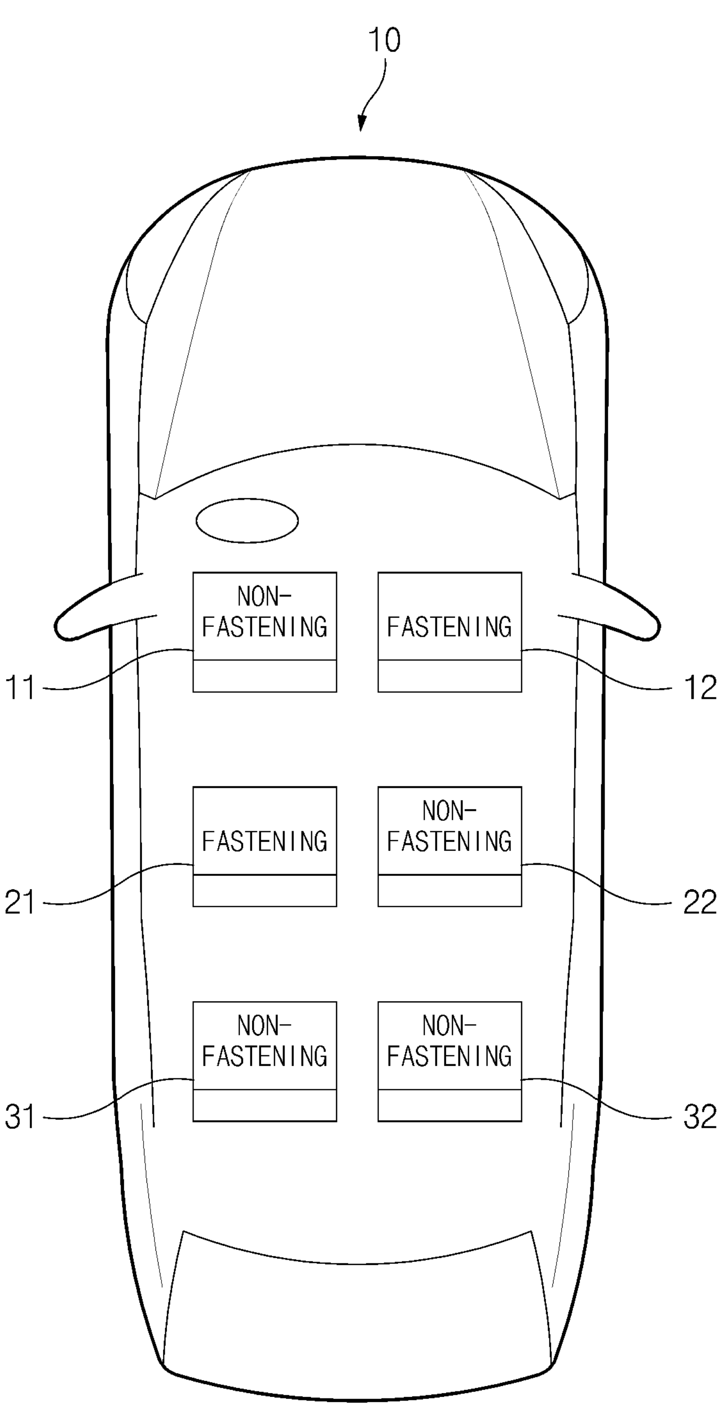
FIG. 2 and FIG. 3 are diagrams schematically illustrating a method of determining an available seat count, according to an exemplary embodiment of the present disclosure.
Figure 3:
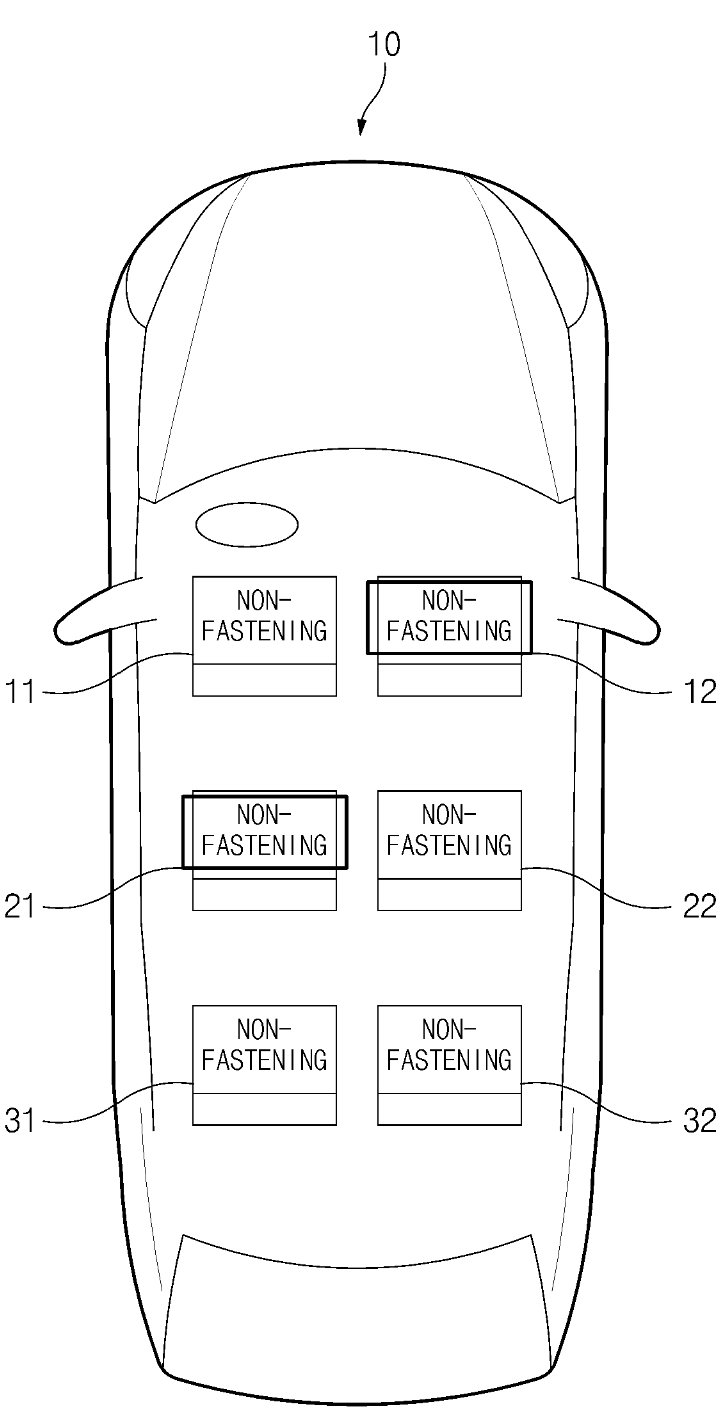

FIG. 2 and FIG. 3 are diagrams schematically illustrating a method of determining an available seat count, according to an exemplary embodiment of the present disclosure.

As shown in FIG. 2, a plurality of vehicle seats 11, 12, 21, 22, 31, and 32 may be provided in the vehicle 10. When a power supply is applied to the vehicle 10 for the first time after the vehicle 10 is assembled, the controller 140 may obtain a seat belt signal output from each vehicle seat.

According to an exemplary embodiment of the present disclosure, the controller 140 may obtain non-fastening signals from the vehicle seats 11, 22, 31, and 32. The controller 140 may be configured to determine that an available seat count is 4, by counting the vehicle seats 11, 22, 31, and 32 from which non-fastening signals are output, and may store the number of seats of the vehicle 10, on which passengers are boarded, as 4. In other words, the controller 140 may be configured to determine that the number of passengers capable of boarding the vehicle 10 is 4.

Besides, when fastening signals are output from the vehicle seats 12 and 21, the controller 140 may monitor seat belt signals of the vehicle seats 12 and 21 where the fastening signal is output, and may store a result of the monitoring.

When a power supply of a vehicle is turned off for the first time and then applied to the vehicle again, the controller 140 may be configured to determine whether seat belt signals of the vehicle seats 12 and 21, from which fastening signals are output, are changed and output to non-fastening signals.

According to an exemplary embodiment of the present disclosure, as shown in FIG. 3, when seat belt signals of the vehicle seats 12 and 21, from which fastening signals are output, are changed and output to non-fastening signals, the controller 140 may be configured to determine that the vehicle seats 12 and 21, where seat belt signals are changed and output to non-fastening signals, are available seats.

The controller 140 may count the number of vehicle seats 12 and 21, where seat belt signals are changed and output to non-fastening signals, and may update the pre-stored available seat count based on a result of the counting. That is, because the counting result indicates that the number of vehicle seats 12 and 21 where fastening signals are changed and output to non-fastening signals is 2, the controller 140 may update the number of available seats to six seats by adding 2 to the pre-stored available seat count (four seats). Accordingly, the controller 140 may be configured to determine that the number of passengers capable of boarding the vehicle 10 is 6.

Because it is determined that the vehicle seats, where seat belt signals are changed and output to non-fastening signals, are available seats, there is no need to monitor a seat belt signal of a vehicle seat changed and output to a non-fastening signal. Accordingly, the controller 140 may delete the seat belt signal of a vehicle seat from a result of the monitoring.

When a seat belt signal of a vehicle seat is changed and output from a fastening signal to a non-fastening signal, the controller 140 may be configured to determine that a passenger is boarding a vehicle seat. The more detailed description is provided with reference to FIG. 4.

Figure 4:
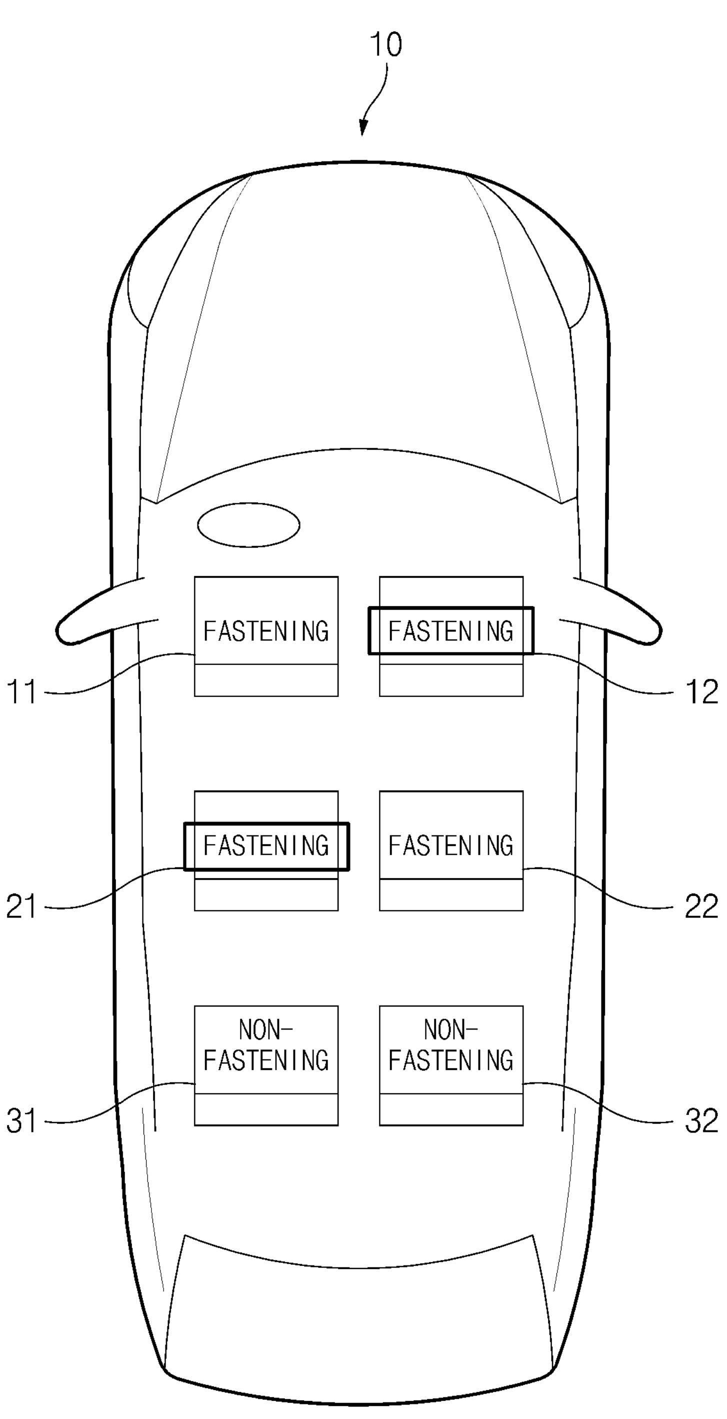
FIG. 4 is a diagram illustrating a method of determining the number of effective passengers, according to an exemplary embodiment of the present disclosure.

FIG. 4 is a diagram illustrating a method of determining the number of effective passengers, according to an exemplary embodiment of the present disclosure.

As illustrated in FIG. 4, when a seat belt signal of a vehicle seat is changed and output from a fastening signal to a non-fastening signal, the controller 140 may be configured to determine that a passenger is boarding the vehicle seats 11, 12, 21, and 22. The controller 140 may be configured to determine that four passengers board seats out of six available seats, and may be configured to determine that the number of effective passengers is four.

Besides, when it is determined based on the state information of a vehicle that an accident occurs, the controller 140 may execute an E-call. When the E-call is executed, the controller 140 may transmit vehicle state information and the updated available seat count to a server. Moreover, according to an exemplary embodiment of the present disclosure, when the E-call is executed, the controller 140 may also transmit the number of effective passengers boarding the vehicle to the server.

Figure 5:
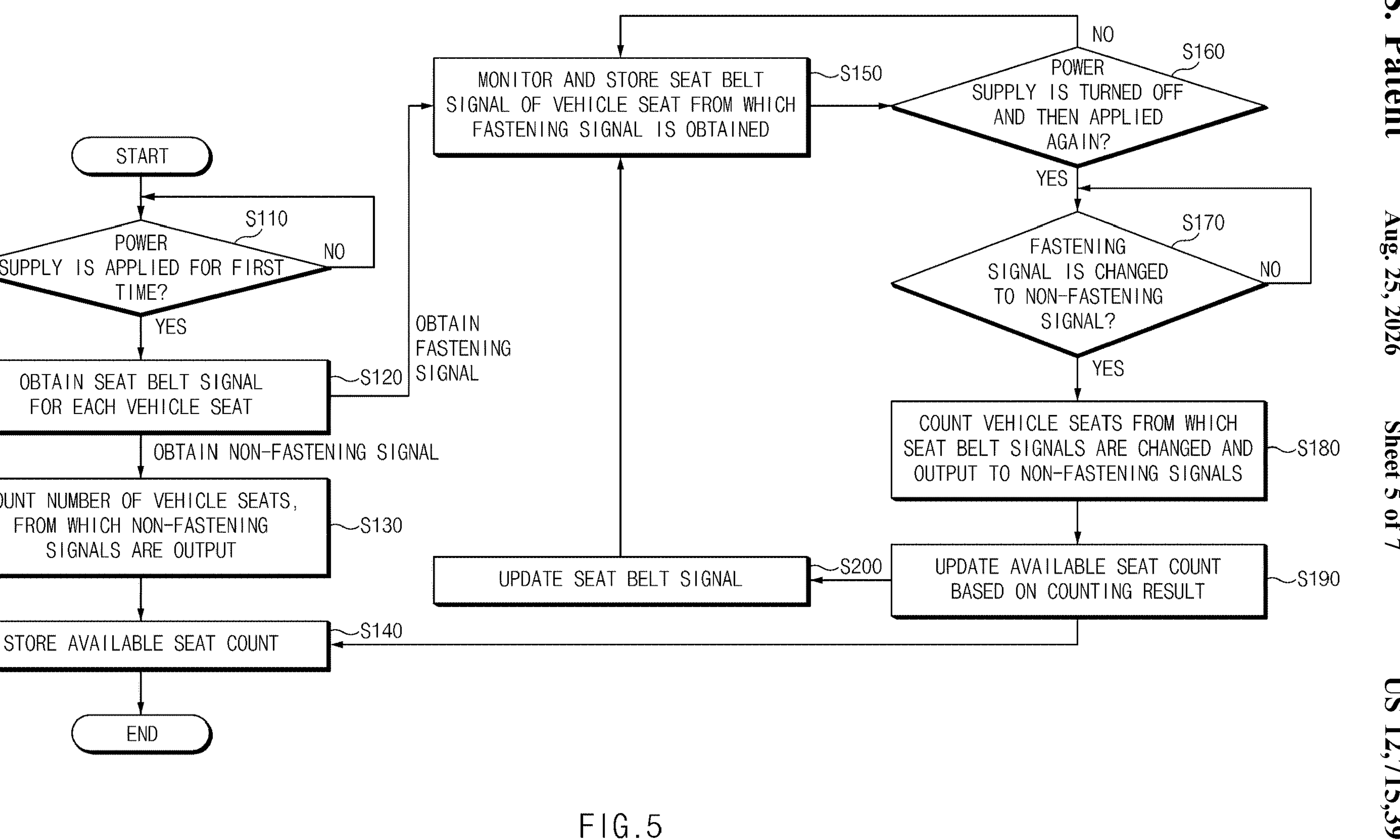
FIG. 5 and FIG. 6 are flowcharts illustrating a vehicle control method, according to an exemplary embodiment of the present disclosure.
Figure 6:
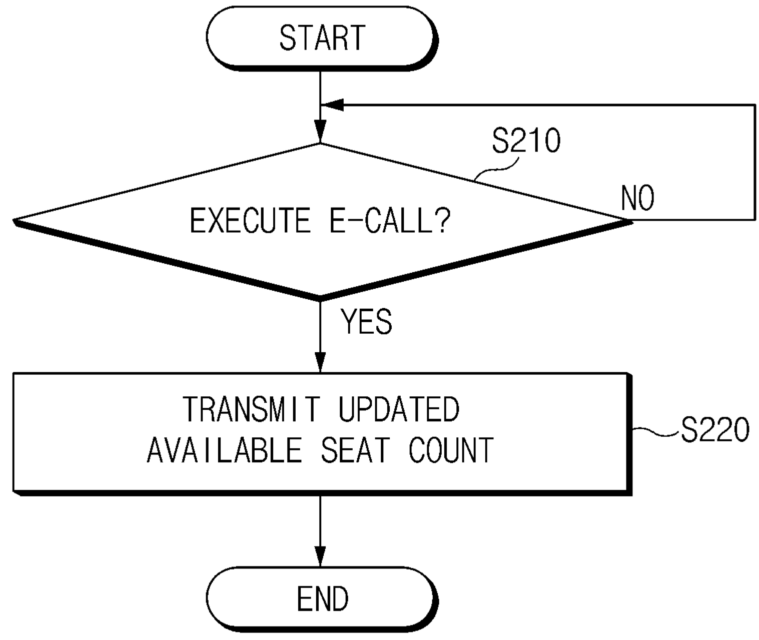

FIG. 5 and FIG. 6 are flowcharts illustrating a vehicle control method, according to an exemplary embodiment of the present disclosure.

As illustrated in FIG. 5, the controller 140 may be configured to determine whether a power supply is applied to a vehicle for the first time after the vehicle is assembled (S110).

The controller 140 may obtain a seat belt signal for each vehicle seat (S120). When the seat belt of the vehicle seat is not fastened, in S120, the controller 140 may obtain a non-fastening signal. When the seat belt of the vehicle seat is fastened, in S120, the controller 140 may obtain a fastening signal.

When obtaining the non-fastening signal, the controller 140 may count the number of vehicle seats, from which the non-fastening signals are output (S130). Besides, the controller 140 may be configured to determine and store the available seat count based on the counting result of vehicle seats from which the non-fastening signals are output (S140). According to an exemplary embodiment of the present disclosure, the controller 140 may be configured to determine that an available seat count is 4, by counting the vehicle seats 11, 22, 31, and 32 from which non-fastening signals are output, and may store the number of seats of the vehicle 10, on which passengers are boarded, as 4 in S140. In other words, the controller 140 may be configured to determine that the number of passengers capable of boarding the vehicle 10 is 4.

When the fastening signal is obtained, the controller 140 may monitor the seat belt signal of the vehicle from which the fastening signal is output, and may store the monitoring result (S150). According to an exemplary embodiment of the present disclosure, in S150, the controller 140 may monitor seat belt signals of the vehicle seats 12 and 21 of FIG. 2 and may store a result of the monitoring.

The controller 140 may be configured to determine whether a power supply of a vehicle is turned off for the first time and then applied again (S160).

When it is determined in S160 that a power supply of a vehicle is turned off for the first time and then applied again, the controller 140 may be configured to determine whether seat belt signals of the vehicle seats 12 and 21, from which fastening signals are output, are changed and output to non-fastening signals (S170).

When it is determined that the seat belt signals of the vehicle seats 12 and 21, from which fastening signals are output, are changed and output to non-fastening signals, the controller 140 may count vehicle seats from which seat belt signals are changed and output to non-fastening signals (S180).

According to an exemplary embodiment of the present disclosure, when the seat belt signals of the vehicle seats 12 and 21, from which fastening signals of FIG. 3 are output, are changed and output to non-fastening signals, in S180, the controller 140 may count the vehicle seats 12 and 21, where seat belt signals are changed and output to non-fastening signals.

The controller 140 may update the pre-stored available seat count based on the counting result (S190). According to an exemplary embodiment of the present disclosure, as shown in FIG. 4, because the counting result indicates that the number of vehicle seats 12 and 21 where fastening signals are changed and output to non-fastening signals is 2, the controller 4 may update the number of available seats to six seats by adding 2 to the pre-stored available seat count (four seats). Accordingly, the controller 140 may be configured to determine that the number of passengers capable of boarding the vehicle 10 is 6. Afterwards, the controller 140 may store the updated available seat count.

The controller 140 may update a seat belt signal of a vehicle seat (S200). According to an exemplary embodiment of the present disclosure, because it is determined that the vehicle seats, where seat belt signals are changed and output to non-fastening signals, are available seats, there is no need to monitor a seat belt signal of a vehicle seat changed and output to a non-fastening signal. Accordingly, the controller 200 may delete the seat belt signal of a vehicle seat from a result of the monitoring. Afterward, the controller 140 may store the update result.

As shown in FIG. 6, the controller 140 may also determine whether the E-call is executed (S210). When it is determined based on state information of a vehicle that an accident occurs, in S210, the controller 140 may execute an E-call.

When the E-call is executed, the controller 140 may transmit vehicle state information and updated available seat count to a server (S220). Moreover, according to an exemplary embodiment of the present disclosure, when the E-call is executed, in S220, the controller 140 may also transmit the number of effective passengers boarding the vehicle to the server.

Figure 7:
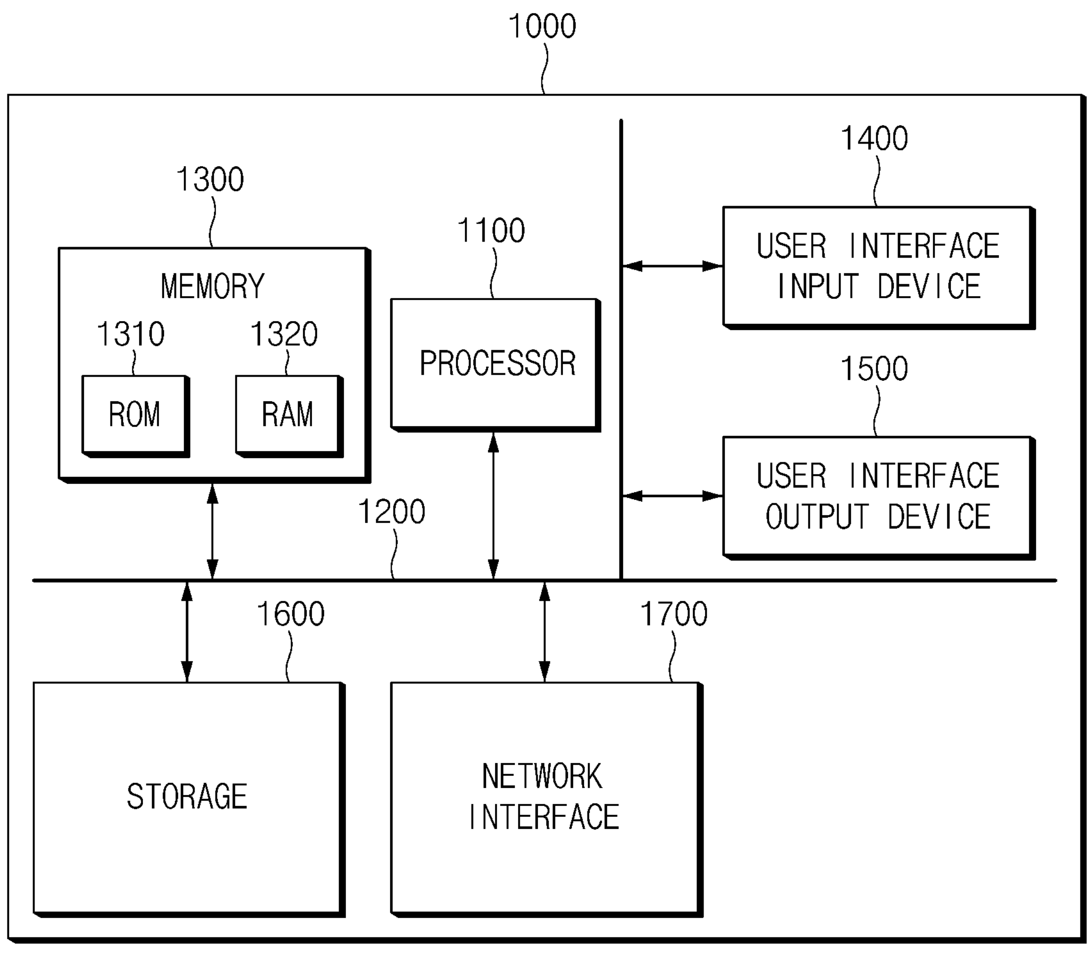
FIG. 7 is a block diagram illustrating a configuration of a determining system performing a method, according to an exemplary embodiment of the present disclosure.

FIG. 7 is a block diagram illustrating a configuration of a computing system performing a method, according to an exemplary embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Thus, the operations of the methods or algorithms described in connection with the exemplary embodiments included in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, various embodiments of the present disclosure are intended not to limit but to explain the technical idea of the present disclosure, and the scope and spirit of the present disclosure is not limited by the above embodiments. The scope of protection of the present disclosure may be construed by the attached claims, and all equivalents thereof should be construed as being included within the scope of the present disclosure.

According to an exemplary embodiment of the present disclosure, a vehicle control apparatus and method may determine the number of available seats (the number of passengers capable of boarding a vehicle) in a vehicle by use of a seat belt signal without additional cost, and may transmit the number of available seats together with data transmitted in the event of a vehicle accident, obtaining additional points upon NCAP authentication.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus comprising:

a sensor provided in each of vehicle seats, and configured to output a fastening signal when a seat belt is fastened, and output a non-fastening signal when the seat belt is not fastened; and a controller electrically connected to the sensor and configured to store an available seat count based on the non-fastening signal and update the available seat count when a seat belt signal is changed and output to the non-fastening signal from a vehicle seat where the fastening signal is output, wherein the controller is further configured to determine whether the seat belt signal is changed and output to the non-fastening signal from the vehicle seat where the fastening signal is output, when a vehicle power supply is turned off for a first time and then is applied to a vehicle again.

2. The vehicle control apparatus of claim 1, wherein the controller is further configured to determine whether the fastening signal is output from at least one vehicle seat, when the vehicle power supply is applied to the vehicle for a first time.

3. The vehicle control apparatus of claim 1, wherein the controller is further configured to monitor a seat belt signal of the vehicle seat where the fastening signal is output, and to store a result of the monitoring.

4. The vehicle control apparatus of claim 1, wherein the controller is further configured to determine that a vehicle seat, where the seat belt signal is changed and output to the non-fastening signal, is an available seat.

5. The vehicle control apparatus of claim 4, wherein the controller is further configured to count vehicle seats from each of which the seat belt signal is changed and output to the non-fastening signal, and to update the stored available seat count based on a result of the counting.

6. The vehicle control apparatus of claim 3, wherein the controller is further configured to delete the seat belt signal of the vehicle seat, which is changed and output to the non-fastening signal, from a result of the monitoring.

7. The vehicle control apparatus of claim 1, wherein the controller is further configured to transmit vehicle state information and the updated available seat count to a server when an Emergency-call (E-call) is executed.

8. A vehicle control method comprising:

obtaining, by a controller, a signal of a seat belt from a sensor provided in each of vehicle seats and configured to output a fastening signal when the seat belt is fastened, and to output a non-fastening signal when the seat belt is not fastened;

storing an available seat count based on the non-fastening signal when the non-fastening signal is output from the sensor;

determining, by the controller, whether the signal of the seat belt is changed and output to the non-fastening signal from the vehicle seat where the fastening signal is output, when a vehicle power supply is turned off for a first time and then is applied to a vehicle again; and updating, by the controller, the available seat count when the signal of the seat belt is changed and output to the non-fastening signal from a vehicle seat from which the fastening signal is output.

9. The method of claim 8, further including:

determining, by the controller, whether the fastening signal is output from at least one vehicle seat, when the vehicle power supply is applied to the vehicle for a first time.

10. The method of claim 8, further including:

monitoring, by the controller, a seat belt signal of the vehicle seat where the fastening signal is output; and storing a result of the monitoring.

11. The method of claim 8, further including:

determining, by the controller, that a vehicle seat, where the signal of the seat belt is changed and output to the non-fastening signal, is an available seat.

12. The method of claim 11, further including:

counting, by the controller, vehicle seats from each of which the signal of the seat belt is changed and output to the non-fastening signal; and updating, by the controller, the stored available seat count based on a result of the counting.

13. The method of claim 10, further including:

deleting, by the controller, the seat belt signal of the vehicle seat, which is changed and output to the non-fastening signal, from a result of the monitoring.

14. The method of claim 8, further including:

transmitting, by the controller, vehicle state information and the updated available seat count to a server when an E-call is executed.

* * * * *